United States Patent [19]

DeWacker

[11] Patent Number: 5,575,840
[45] Date of Patent: Nov. 19, 1996

[54] CEMENT MORTAR SYSTEMS USING BLENDS OF POLYSACCHARIDES AND COLD-WATER-SOLUBLE, UNMODIFIED STARCHES

[75] Inventor: Dennis R. DeWacker, Belle Mead, N.J.

[73] Assignee: National Starch and Chemical Investment Holding Corporation, Wilmington, Del.

[21] Appl. No.: 406,090

[22] Filed: Mar. 17, 1995

Related U.S. Application Data

[63] Continuation-in-part of Ser. No. 254,016, Jun. 3, 1994, abandoned, which is a continuation-in-part of Ser. No. 146,264, Oct. 29, 1993, abandoned.

[51] Int. Cl.[6] .............................. C04B 24/10; C04B 24/38
[52] U.S. Cl. .................. 106/162.81; 106/804; 106/805; 106/205.01; 106/206.1; 524/2; 536/56; 536/84; 536/102
[58] Field of Search ...................... 106/730, 162, 106/163.1, 164, 169, 210, 804, 805; 524/2, 650; 536/102, 84, 56

[56] References Cited

U.S. PATENT DOCUMENTS

| | | | |
|---|---|---|---|
| 2,449,211 | 2/1944 | Andes et al. | 106/92 |
| 2,489,793 | 11/1949 | Ludwig | 106/92 |
| 3,936,311 | 2/1976 | Kirst et al. | 106/90 |
| 4,073,658 | 2/1978 | Ohtani et al. | 106/92 |
| 4,451,649 | 5/1984 | Teubner et al. | 536/111 |
| 4,487,864 | 12/1984 | Bermudez et al. | 524/2 |
| 4,585,353 | 4/1986 | Schönhausen | 366/11 |
| 4,654,085 | 3/1987 | Schinski | 106/93 |
| 4,708,745 | 11/1987 | Schönhausen | 106/85 |
| 5,207,830 | 5/1993 | Cowan et al. | 106/672 |

FOREIGN PATENT DOCUMENTS

| | | |
|---|---|---|
| 821726 | 2/1975 | Belgium . |
| 823869 | 4/1976 | Belgium . |
| 3105576A1 | 2/1981 | Germany . |
| 3105576 | 2/1981 | Germany . |
| 3239081A1 | 10/1982 | Germany . |
| 3239081 | 10/1982 | Germany . |
| 3913518A1 | 4/1989 | Germany . |
| 3913518 | 4/1989 | Germany . |
| 52-41213 | 4/1977 | Japan . |
| 53-126030 | 11/1978 | Japan . |
| 58-123390 | 7/1983 | Japan . |
| 59-94557 | 5/1984 | Japan . |
| 60-16842 | 1/1985 | Japan . |
| 60-225930 | 10/1985 | Japan . |
| 60-239347 | 11/1985 | Japan . |
| 61-72663 | 4/1986 | Japan . |
| 61-247650 | 11/1986 | Japan . |
| 1261250 | 10/1989 | Japan . |
| 1121454 | 2/1965 | United Kingdom . |
| 1425822 | 1/1972 | United Kingdom . |
| 1483198 | 4/1974 | United Kingdom . |
| 1508761 | 2/1977 | United Kingdom . |
| 2138014 | 10/1984 | United Kingdom . |

*Primary Examiner*—Paul Marcantoni
*Attorney, Agent, or Firm*—William K. Wissing

[57] ABSTRACT

A water retention aid for use in cementitious and adhesive compositions is prepared as a blend of a polysaccharide, preferably high viscosity, such as cellulose, and an unmodified, cold-water-soluble starch. The water retention aid is used in the cementitious or adhesive composition at a preferred level of 0.25–0.5 parts per 100 parts of the dry cementitious or adhesive composition.

28 Claims, No Drawings

CEMENT MORTAR SYSTEMS USING BLENDS OF POLYSACCHARIDES AND COLD-WATER-SOLUBLE, UNMODIFIED STARCHES

This application is a continuation-in-part of application Ser. No. 08/254,016, filed Jun. 3, 1994, abandoned, which is a continuation-in-part of Ser. No. 08/146,264, filed Oct. 29, 1993, now abandoned.

FIELD OF THE INVENTION

This invention relates to cementitious and adhesive compositions using polysaccharides as water retention aids.

BACKGROUND OF THE INVENTION

Adhesives and cementitious compositions, such as, mortars, concretes, and plasters, typically comprise additives to improve one or more properties of the compositions. For example, the additive may improve certain rheological properties of the composition, such as sag resistance, or water retention properties of the composition, or adhesive properties of the compositions, or a combination of properties. For instance, it is taught that various carbohydrate polymers, such as cellulose ethers and starches, may be used independently in the cementitious and adhesive compositions as water retention aids. In mortars prepared specifically for adhering ceramic tiles to substrates, the water retention aid prevents the loss of water to the ceramic tile or substrate, allowing the use of a thin bed of mortar rather than a thick bed. The water retention aid also increases the amount of open time of the mortar, that is, the amount of time after the mortar is made but before it sets, and thus allows adjustment of the tile after it is initially placed in contact with the mortar composition.

While the noted polymers are generally known as water retention aids, modifications of the polymers are often made to improve rheological properties of the cementitious compositions containing the polymers. For example, ceramic tile adhesives containing clays, asbestos and long chain organic polymers are said to exhibit improved rheological properties. However, the improved rheological properties may be gained at the expense of reduced bonding strength and/or workability.

U.S. Pat. No. 4,487,864, issued on Dec. 11, 1984 to Bermudez et al., discloses modified carbohydrate polymers for use as water retention aids. The carbohydrate polymers, which may include cellulose ethers, starches such as tapioca starches and modified starches, are modified with up to 50% by weight of a water-swellable, crosslinked nonflocculating organic polymer, based on the total weight of the carbohydrate polymer and the crosslinked organic polymer. The addition of the nonflocculating polymer is said to exhibit improved rheological properties as compared to compositions containing conventional retention aids. Cellulose ethers so modified are preferably used as the water retention aid in the cementitious compositions.

U.S. Pat. No. 4,073,658, issued Feb. 14, 1978 to Ohtani et al., discloses a hydraulic cement composition comprising a hydraulic cement and a water reducing agent which is a product of hydrogenation of an oligosaccharide. The oligosaccharide is formed by the hydrolysis of starch, cellulose or hemicellulose. An aqueous solution of the hydrolyzate is prepared and the terminal aldehyde groups thereof are reduced and converted to hydroxyl groups by hydrogenation conducted under high temperature and high pressure in the presence of a catalyst.

U.S. Pat. No. 4,451,649, issued May 29, 1984 to Teubner et al., discloses hydroxypropyl-modified starch which is etherified in the presence of a small amount of water with an excess of propylene oxide. The hydroxypropyl starch is used in combination with cellulose ethers as a "set-up agent", which is said to influence the rheology of a plaster and improve its processing properties.

Japanese Public Patent Disclosure Bulletin No. 61-72663 discloses cement mortar compositions, wherein hydroxyalkyl modified starches of limited degrees of substitution are used in combination with water-soluble nonionic cellulose ethers to promote sag resistance. It is stated that other modified and unmodified starches do not have the required properties to be used in the mortar compositions.

U.S. Pat. No. 4,654,085, issued Mar. 31, 1987 to Schinski, discloses an additive for cementitious compositions which comprises a cellulose ether, a starch ether and a polyacrylamide. The additives are said to improve the anti-sag properties of the cementitious compositions.

As noted above, carbohydrate polymers, particularly cellulose ethers, are employed as water retention aids. Also as noted above, the cellulose ethers are commonly used in combination with modified starches to improve rheological properties of the cementitious compositions containing the cellulose ether water retention aids. However, the addition of these materials increases the cost of the mortar composition, creating an incentive to find more economical polymers. In addition, the use of modified starches requires additional processing of the starch prior to incorporation into the cementitious composition.

There is a long felt need to develop new water retention aids for use in cementitious and adhesive compositions which are economically viable replacements for the cellulose ethers, which do not require starch pretreatment processes, and which provide sufficient water retention properties and favorable rheological properties for good workability. In addition, the additives must maintain adhesive bond strength in the cementitious and adhesive compositions and not contribute to the loss in adhesive properties thereof.

It has now been discovered that a partial substitution of cellulose ethers can be made with an unmodified, cold-water-soluble starch, without the loss of water retention properties, or favorable rheological properties for good workability, or bond strength in the adhesive or cementitious composition. This discovery is especially surprising in view of the fact that modified starches, which are highly preferred for use in water retention aids according to the overwhelming teaching of the prior art, were found to exhibit a loss in adhesive properties when used similarly in combination with a cellulose ether. While the independent use of cellulose ethers and starches as water retention aids are known in general, combinations of cellulose ethers and unmodified, cold-water-soluble starches as water retention aids are not disclosed or taught in the prior art.

SUMMARY OF THE INVENTION

This invention is a composition, useful as an additive to aid in water retention in cementitious and adhesive compositions, comprising a mixture of a cold-water-soluble, unmodified starch and a polysaccharide, preferably a high viscosity polysaccharide, other than the cold-water-soluble, unmodified starch. The water retention aids are substantially free of modified starches. The invention also relates to cementitious and adhesive compositions comprising from about 0.25 to 10 parts, preferably 0.25 to 0.5 parts, per 100 parts by weight of the dry cementitious or adhesive composition. The cementitious or adhesive compositions are also substantially free of modified starches. The invention is also directed to methods of improving the water retention properties of cementitious compositions which contain the inventive water retention compositions.

DETAILED DESCRIPTION OF THE INVENTION

Cementitious compositions generally mean compositions containing a hydraulic cement that are employed as mortars, concretes, ceramic tile adhesives, crack fillers, caulks, and plasters. The term cement is used broadly to mean a material that reacts to form a hard hydrate on mixture with water, the most common cements being alumina cement, Portland cement, and gypsum. When used as mortars for the setting of ceramic tile, cementitious compositions will comprise in a major proportion sand, Portland cement, and lesser amounts of inert fillers chosen to adjust the properties of the mortar to the specific application. In many applications, a water retention aid is added to the dry cementitious composition to increase the open time for working with the cement before it hardens.

In other adhesive applications, such as in wall paper adhesives and tape joint compound, water retention aids are added to improve trowelability and rheology of the adhesive. Such adhesives may include, for example, clays, calcium carbonate, synthetic polymers, and other ingredients commonly used in formulating those types of adhesives.

This invention is an improved composition to aid in the retention of water in cementitious and adhesive compositions and comprises a polysaccharide, preferably at a viscosity of greater than 10,000 centipoises, mixed with an otherwise unmodified, cold-water-soluble starch. By cold-water-soluble, it is meant that at least 90% by weight of the starch will be soluble in cold water with agitation and without cooking the starch. While polysaccharides having molecular weight (number average) sufficient to give Brookfield viscosity of greater than 10,000 cps at 20° C. for a 2 percent aqueous solution are preferred, the molecular weight and, thus, the viscosity are dependent in part on the selection of the respective polysaccharide and unmodified cold-water-soluble starch. When used herein, polysaccharide shall be deemed to include all suitable polysaccharides, such as cellulose, cellulose derivatives, gums and hemicellulose. Suitable gums include, for example, xanthan gum, guar gum and locust bean gum. The preferred polysaccharides are the cellulose derivatives. As used herein, polysaccharide is not meant to include starches, modified or unmodified.

Examples of the preferred cellulose derivatives are cellulose ethers, such as, alkyl celluloses, hydroxyalkyl celluloses, mixed alkyl celluloses, mixed hydroxy alkyl celluloses, and mixed alkyl and hydroxyalkyl celluloses. Cellulose is a naturally occurring, high polymeric carbohydrate. These cellulose ethers are the reaction products of the etherification of cellulose with known etherifying agents, such as alkyl halides and alkylene oxides. Specific examples of suitable cellulose ethers are methyl cellulose, ethyl cellulose, propyl cellulose; hydroxyethyl cellulose and hydroxypropyl cellulose; methylethyl cellulose, methylpropyl cellulose, ethylpropyl cellulose; hydroxyethylhydroxy-propyl cellulose, hydroxypropylhydroxyethyl cellulose; methylhydroxypropyl cellulose, hydroxypropylmethyl cellulose, methylhydroxyethyl cellulose, ethyl-hydroxyethyl cellulose, hydroxyethylmethyl cellulose, propylhydroxypropyl cellulose, and hydroxypropylpropyl cellulose.

The molecular weight and molar substitution of the cellulose ether are not narrowly critical, and are dependent, in part, upon the particular unmodified cold-water-soluble starch with which the cellulose is combined, although high molecular weight (number average) celluloses having a Brookfield viscosity of greater than 10,000 centipoises, preferably greater than 15,000 centipoises, at 20° C. for a 2 percent aqueous solution, give better performance in mortars in combination with the unmodified starches and are preferred. The starches suitable for use in combination with the polysaccharide are unmodified, cold-water-soluble starches. Starch is a naturally occurring, high-polymeric carbohydrate commercially extracted from grains, roots or tubers. It occurs in the form of white granules, usually made up of both amylose (linear polymer) and amylopectin (branched polymer), which are insoluble in cold water. Starch can be made soluble in water by pregelatinization and subsequent drying. In the context herein, "unmodified" means that the starch has not been hydrogenated, hydrolyzed, etherified, crosslinked, oxidized, sulfonated, or treated in any other manner other than to make the starch cold-water-soluble. The use of these unmodified, cold-water-soluble starches as partial substitutes for other water retention aids, such as cellulose and modified starches, in cementitious and adhesive compositions offers the advantages of low cost and ease of preparation of the unmodified starches, without sacrificing water retention, rheological, cohesive or adhesive properties.

Contrary to teachings of the prior art, it has been discovered that the use of modified starches in the water retention aids causes a loss in the bond strength of cementitious compositions which contain the water retention aids. Accordingly, the water retention aids and the cementitious and adhesive compositions of the present invention are substantially free of modified starches. By substantially free, it is meant that the compositions do not contain modified starches in levels which would detrimentally affect the bond strength of the cementitious or adhesive compositions. For instance, cementitious compositions containing 0.1 percent by weight of an agglomerated, crosslinked, waxy maize starch were found to exhibit unacceptable 7-day shear bond strength. In other cementitious compositions containing 0.25 percent by weight of a spray-dried, crosslinked, acetylated, waxy maize starch, unacceptable 7-day shear bond strength were observed. As it can be seen, the exact amount of unmodified starch which may be tolerated will depend upon the type of starch and the type of modification made to the starch. Preferably, the water retention aids and the compositions containing the water retention aids are free of modified starches.

The ratio of starch to polysaccharide within the water retention composition can vary from 1:4 to 4:1, preferably from 7:3 to 1:4, more preferably from 3:2 to 1:4. The water retention compositions may contain minor amounts of the unmodified, cold-water-soluble starch, but preferably will include a major proportion of the unmodified, cold-water-soluble starch to obtain the most cost benefit. The maximum amount of starch which may be used in the water retention compositions is such that the cementitious or adhesive compositions containing the water retention compositions are not rendered inoperative for the purpose for which they are used. That is to say, the performance properties of the cementitious or adhesive compositions, such as adhesion, cohesion, viscosity and water retention, as the case may be, are not detrimentally affected to the extent that the compositions no longer perform their intended function. The water retention composition will contain at least a minimum amount of the unmodified cold-water-soluble starch, 1 percent by weight for example, up to about 80 percent starch by weight, preferably from about 20 to 70 percent starch by weight, more preferably from about 50 to 60 percent starch by weight. The water retention composition will contain from about 20 to 99 percent by weight of a polysaccharide.

The water retention composition is used by dry mixing an amount with the hydraulic cement or the adhesive and any optional filler. Sufficient water is added to provide an adhesive slurry or to allow the cement to hydrate and to make a wet mortar of workable consistency, the optimum amount of water depending on the particular application. The specific amount of water retention composition used in the cementitious or adhesive composition will be an amount sufficient to prevent significant loss of water from the wet cementitious or adhesive composition due to evaporation, absorption by substrates, such as ceramic tiles, or by any other mechanisms by which water is lost. Typically, the water retention composition will be present in an amount from 0.05 to 10 parts per 100 parts by weight of the dry cementitious or adhesive composition. Excess amounts of the water retention composition do not appreciably improve water retention, and do add to cost; therefore, the amount will preferably be from 0.25 to 2.0 parts, more preferably 0.25 to 0.5 parts, per 100 parts by weight of the dry cementitious or adhesive composition.

In the following examples, ceramic tile mortars were prepared with a water retention aid comprising cellulose and various unmodified, cold-water-soluble starches. These examples are given to illustrate the invention, but should not be deemed to limit it.

EXAMPLES

Example 1

This example shows the preferred viscosities for celluloses when used in combination with cold-water-soluble, unmodified starch in water retention compositions for ceramic tile mortar.

A series of commercially available cellulose ethers having varying viscosities sold under the tradename Methocel by Dow Chemical, Midland, Michigan, were mixed in a 1:1 ratio with a spray-dried, cold-water-soluble, unmodified starch and used as water retention compositions.

The sample water retention compositions were individually admixed into dry cementitious mortar compositions at levels of 0.25 and 0.5 parts per 100 parts of the dry mortar. The dry mortar contained 45 parts by weight of Portland Type 1 cement, 55 parts by weight of F-65 sand (American Foundries standard grade), and 0.05 parts by weight of Foamaster PD-1D (a product of Henkel Corporation, Ambler, Pennsylvania). Water was added in a ratio of 1 part water to 4 parts mortar.

The mortars containing the sample water retention compositions were compared to mortars containing only cellulose as the water retention aid by testing for 7-day shear bond strength according to the American National Standard Institute's (ANSI) specifications for Latex-Portland Cement Mortar A118.1-1992, which is hereby incorporated by reference in its entirety. The mortars were stressed in shear to failure and were deemed to pass ANSI specification if the average shear strength was greater than 200 psi (14 kg/cm$^2$).

The data are set out in Table 1 and show that at a level of 0.5 parts water retention composition per 100 parts of dry mortar, the substitution of one-half the amount of cellulose with a cold-water-soluble, unmodified starch does not impair the performance of the mortar. At a level of 0.25 parts per 100 parts of dry mortar, the substitution of one-half the amount of cellulose with a cold-water-soluble, unmodified starch results in mortars which pass ANSI specifications, although some loss of shear property is noted. Accordingly, at lower levels of use of the water retention composition, selection of a higher viscosity cellulose is preferred.

TABLE 1

Viscosity of Cellulose Required for Thin Set Mortars Containing Starch Substituted for Cellulose

| Cellulose[a] | | Starch[b] | | 7-Day Shear |
|---|---|---|---|---|
| A. 0.5 parts starch/cellulose per 100 parts by weight mortar | | | | |
| K4M | 0.5 | | 0 | 350 psi |
| K4M | 0.25 | corn | 0.25 | 341 psi |
| K15 | 0.25 | corn | 0.25 | 309 psi |
| K75M | 0.25 | corn | 0.25 | 320 psi |
| J12MS | 0.25 | corn | 0.25 | 339 psi |
| J20MS | 0.25 | corn | 0.25 | 381 psi |
| J40MS | 0.25 | corn | 0.25 | 361 psi |
| J75MS | 0.25 | corn | 0.25 | 316 psi |
| F4M | 0.5 | | 0 | 377 psi |
| K15M | 0.25 | waxy | 0.25 | 375 psi |
| Aqualon 20M | 0.25 | waxy | 0.25 | 339 psi |
| Berol 481 | 0.25 | waxy | 0.25 | 367 psi |
| B. 0.25 parts starch/cellulose per 100 parts by weight mortar | | | | |
| K4M | 0.25 | | 0 | 319 psi |
| K4M | 0.125 | corn | 0.125 | 238 psi |
| K15M | 0.25 | | 0 | 361 psi |
| K15M | 0.125 | corn | 0.125 | 302 psi |

[a]All celluloses, except for Aqualon 20M and Berol 481, are products of Dow Chemical, the initial letter denoting a degree of substitution, and the number following the initial letter (× 1000) denoting Brookfield viscosity.
Aqualon 20M is a product of Aqualon Company, Wilmington, Delaware.
Berol 481 is a product of Berol Nobel, Inc., Stratford, Connecticut.
[b]Corn = cold-water-soluble unmodified corn starch.
Waxy = cold-water-soluble unmodified waxy maize.

Example 2

This example shows preferred unmodified starch/cellulose ratios for the water retention composition. A series of water retention compositions was prepared with a spray-dried, cold-water-soluble, unmodified waxy maize starch, in combination with Methocel®K15M at varying ratios. The sample compositions were individually admixed into dry cementitious compositions containing 45 parts by weight of Portland Type 1 cement, 55 parts by weight of F-65 sand, and 0.05 parts by weight of Foamaster PD-1D, at a level of 0.5 parts per 100 parts of the dry cementitious composition. Water was added in a ratio of 1 part water to 4 parts mortar.

The mortars containing the sample water retention compositions were initially screened for water retention by testing adhesion to the unglazed side of a ceramic tile. A patty of the mortar was troweled onto the unglazed side and allowed to dry overnight. Mortars were given a +rating if they adhered, and a -rating if they did not adhere, and these ratings are noted in the following table. If the mortar adhered it was then tested for 7-day shear bond strength according to ANSI specification A118.1-1992 by stressing in shear to failure. The results are set out in Table 2.

TABLE 2

Ratio of Cellulose Required for Thin
Set Mortars Containing Starch Substituted for Cellulose
Variations in starch/cellulose
ratio at 0.5 parts per 100 parts mortar

| Starch | K15M Cellulose | Tile Adhesion | 7-Day Shear |
|--------|----------------|---------------|-------------|
| 5 | 0 | − | not run |
| 4 | 1 | − | 158 psi |
| 3 | 2 | + | 310 psi |
| 2 | 3 | + | 310 psi |
| 1 | 4 | + | 331 psi |
| 0 | 5 | + | 376 psi |

Example 3

This example shows additional preferred unmodified starch/cellulose ratios for the water retention compositions. The water retention compositions were prepared and tested according to Example 2. Results are set out in Table 3.

TABLE 3

Ratio of Cellulose Required for Thin
Set Mortars Containing Starch Substituted for Cellulose
Variations in starch/cellulose
ratio at 0.5 parts per 100 parts mortar

| Starch | K15M Cellulose | Tile Adhesion | 7-Day Shear |
|--------|----------------|---------------|-------------|
| 4 | 1 | − | 63 |
| 3 | 1 | + | 132 psi |
| 7 | 3 | + | 213 psi |
| 6.5 | 3.5 | + | 358 psi |
| 3 | 2 | + | 364 psi |

As the date in Tables 2 and 3 indicate, the unmodified starch to cellulose ratio preferably ranges from about 7:3 to 1:4, more preferably from about 3:2 to 1:4. While the data shows that the particular cold-water-soluble, unmodified starch and cellulose selected for the examples does not surpass ANSI 118.1 standards at ratios greater than about 7:3, one skilled in the art will recognize, once armed with the present specification, that selection of higher viscosity celluloses or combination of particular celluloses with particular unmodified starches will yield water retention aids which meet the necessary criteria at ratios greater than about 7:3 up to about 4:1.

Example 4

This example gives the shear bond strength of various water retention compositions containing various modified starches and unmodified, cold-water-soluble starches in combination with cellulose.

A series of water retention compositions was prepared with a number of different starches in combination with Methocel®K4M and K15M at varying ratios. The sample compositions were individually admixed into dry mortar compositions at 0.5 parts per 100 parts of the dry cementitious mortar composition. The mortar contained 45 parts by weight of Portland Type 1 cement, 55 parts by weight of F-65 sand, and 0.05 parts by weight of Foamaster PD-1D. Water was added in a ratio of 1 part water to 4 parts mortar.

The mortars containing the sample water retention compositions were tested for 7-day shear bond strength according to ANSI specification A118.1-1992 by stressing in shear to failure. The results are given in psi and are set out in Table 3. The data show that a wide variety of cold-water-soluble, unmodified starches, are suitable for partial substitution of the more costly cellulose. The data also show that derivatized or crosslinked starches actually inhibit water retention and ultimately the shear strength of the mortar, even when used in small amounts.

TABLE 4

Starch Replacement of Cellulose for Thin-Set Mortars

| Composition by Weight in parts per 100 parts Mortar | | 7-Day Shear Bond |
|---|---|---|
| Starch | Cellulose | psi |
| (control) | 0 | 0.25 | 328 |
| (control) | 0 | 0.50 | 350 |
| spray-dried unmodified corn | 0.25 | 0.25 | 403 |
| agglomerated, cross-linked, waxy maize | 0.10 | | not run, poor adhesion |
| spray-dried, agglomerated unmodified corn | 0.20 | 0.20 | |
| spray-dried, cross-linked, acetylated, waxy maize | 0.25 | 0.25 | not run, poor adhesion |
| cross-linked, waxy maize | 0.05 | 0.45 | not run, poor adhesion |
| agglomerated, cross-linked, waxy maize | 0.25 | 0.25 | not run, poor adhesion |
| spray-dried, agglomerated, unmodified corn | 0.25 | 0.25 | 339 |
| spray-dried, unmodified corn | 0.25 | 0.25 | 327 |
| spray-dried, agglomerated, unmodified corn | 0.15 | 0.25 | 108 |
| agglomerated, crosslinked, waxy maize | 0.10 | | |
| spray-dried, unmodified waxy | 0.20 | 0.30 | 310 |
| spray-dried, unmodified waxy | 0.25 | 0.25 | 403 |
| extruded unmodified corn | 0.25 | 0.25 | 373 |
| Miragel ® 463, (AE Staley Co.) physically modified, corn | 0.25 | 0.25 | 353 |

TABLE 4-continued

Starch Replacement of Cellulose for Thin-Set Mortars

| Composition by Weight in parts per 100 parts Mortar | | | 7-Day Shear Bond |
|---|---|---|---|
| Starch | | Cellulose | psi |
| spray-dried, unmodified corn | 0.25 | 0.25 | 370 |
| jet-cooked, spray-dried, unmodified corn | 0.25 | 0.25 | 338 |
| (control) | 0 | 0.5 | 419 |
| xanthan gum | 0.25 | 0.25 | 402 |
| unmodified amioca | 0.25 | 0.25 | 411 |
| unmodified tapioca | 0.25 | 0.25 | 434 |
| unmodified potato | 0.25 | 0.25 | 369 |
| drum dried unmodified corn | 0.25 | 0.25 | 397 |

I claim:

1. A composition for use as a water retention aid in cementitious formulations, said composition comprising:
   from about 1 to 80 weight percent of a cold-water-soluble, unmodified starch; and
   from about 20 to 99 weight percent of a polysaccharide selected from the group consisting of cellulose, hemicellulose, cellulose derivatives, and gums, wherein the composition is substantially free of a modified starch.

2. The composition according to claim 1 wherein a 2 percent aqueous solution of the polysaccharide has a Brookfield viscosity greater than 10,000 centipoises at 20° C.

3. The composition according to claim 1 wherein the cellulose derivative is an etherified cellulose.

4. The composition according to claim 3 wherein the etherified cellulose is selected from the group consisting of methyl cellulose, ethyl cellulose, propyl, cellulose hydroxyethyl cellulose, hydroxypropyl cellulose, methylethyl cellulose, methylpropyl cellulose, ethylpropyl cellulose, hydroxyethyl-hydroxypropyl cellulose, hydroxypropylhydroxyethyl cellulose, methylhydroxypropyl cellulose, hydroxypropylmethyl cellulose, methylhydroxyethyl cellulose, ethylhydroxyethyl cellulose, hydroxyethylmethyl cellulose, propylhydroxypropyl cellulose, and hydroxypropylpropyl cellulose.

5. The composition according to claim 1 comprising from about 20 to 70 weight percent of the cold-water-soluble, unmodified starch.

6. The composition according to claim 1 wherein the cold-water-soluble, unmodified starch and the polysaccharide are present in a ratio of from 7:3 to 1:4, respectively.

7. The composition according to claim 1 consisting essentially of the cold-water-soluble, unmodified starch and the polysaccharide.

8. The composition according to claim 1 consisting of the cold-water-soluble, unmodified starch and the polysaccharide.

9. A cementitious composition, comprising:
   from about 0.25 to 10 parts by weight of a water retention composition per 100 parts by dry weight of the cementitious composition, wherein the water retention composition comprises:
   from about 1 to 80 weight percent of a cold-water-soluble, unmodified starch; and
   from about 20 to 99 weight percent of a polysaccharide selected from the group consisting of cellulose, hemicellulose, cellulose derivatives, and gums,
   wherein the cementitious composition and the water retention composition are substantially free of a modified starch.

10. The cementitious composition according to claim 9 wherein the cellulose derivative is an etherified cellulose.

11. The cementitious composition according to claim 10 wherein the etherified cellulose is selected from the group consisting of methyl cellulose, ethyl cellulose, propyl cellulose, hydroxyethyl cellulose, hydroxypropyl cellulose, methylethyl cellulose, methylpropyl cellulose, ethylpropyl cellulose hydroxyethyl-hydroxypropyl cellulose, hydroxypropylhydroxyethyl cellulose, and methylhydroxypropyl cellulose, hydroxypropylmethyl cellulose, methylhydroxyethyl cellulose, ethylhydroxyethyl cellulose, hydroxyethylmethyl cellulose, propylhydroxypropyl cellulose, and hydroxypropylpropyl cellulose.

12. The cementitious composition according to claim 9 wherein the water retention composition comprises from about 20 to 70 weight percent of the cold-water-soluble, unmodified starch.

13. The cementitious composition according to claim 9 wherein the cold-water-soluble, unmodified starch and the polysaccharide are present in a ratio from 7:3 to 1:4, respectively.

14. The cementitious composition of claim 9 wherein the water retention composition consists essentially of the cold-water-soluble, unmodified starch and the polysaccharide.

15. The cementitious composition of claim 9 wherein the water retention composition consists of the cold-water-soluble, unmodified starch and the polysaccharide.

16. An adhesive composition, comprising:
   from about 0.25 to 10 parts by weight of a water retention composition per 100 parts by dry weight of the adhesive composition, wherein the water retention composition comprises:
   from about 1 to 80 weight percent of a cold-water-soluble, unmodified starch; and from about 20 to 99 weight percent of a polysaccharide selected from the group consisting of cellulose, hemicellulose, cellulose derivatives, and gums,
   wherein the adhesive composition and the water retention composition are substantially free of a modified starch.

17. The adhesive composition according to claim 16 wherein the cellulose derivative is an etherified cellulose.

18. The adhesive composition according to claim 17 wherein the etherified cellulose is selected from the group consisting of methyl cellulose, ethyl cellulose, propyl cellulose, hydroxyethyl cellulose, hydroxypropyl cellulose, methylethyl cellulose, methylpropyl cellulose, ethylpropyl cellulose, hydroxyethyl-hydroxypropyl cellulose, hydroxypropylhydroxyethyl cellulose, methylhydroxypropyl cellulose, hydroxypropylmethyl cellulose, methylhydroxyethyl cellulose, ethylhydroxyethyl cellulose, hydroxyethylmethyl cellulose, propylhydroxypropyl cellulose, and hydroxypropylpropyl cellulose.

19. The adhesive composition according to claim 16 wherein the water retention composition comprises from about 20 to 70 weight percent of the cold-water-soluble, unmodified starch.

20. The adhesive composition according to claim 16 wherein the cold-water-soluble, unmodified starch and the polysaccharide are present in a ratio from 7:3 to 1:4, respectively.

21. The adhesive composition of claim 16 wherein the water retention composition consists essentially of the cold-water-soluble, unmodified starch and the polysaccharide.

22. The adhesive composition of claim 16 wherein the water retention composition consists of the cold-water-soluble, unmodified starch and the polysaccharide.

23. A method of improving the water retention properties of a cementitious composition, the method comprising: admixing with the cementitious composition from about 0.25 to 10 parts by weight of a water retention composition per 100 parts by dry weight of the cementitious composition, wherein the water retention composition comprises from about 1 to 80 weight percent of a cold-water-soluble, unmodified starch; and from about 20 to 99 weight percent of a polysaccharide selected from the group consisting of cellulose, hemicellulose, cellulose derivatives, and gums, and wherein the cementitious composition and the water retention composition are substantially free of a modified starch.

24. The method of claim 23 wherein the water retention composition consists essentially of the cold-water-soluble, unmodified starch and the polysaccharide.

25. The method of claim 23 wherein the water retention composition consists of the cold-water-soluble, unmodified starch and the polysaccharide.

26. A method of improving the water retention properties of an adhesive composition, the method comprising: admixing with the adhesive composition from about 0.25 to 10 parts by weight of a water retention composition per 100 parts by dry weight of the adhesive composition, wherein the water retention composition comprises from about 1 to 80 weight percent of a cold-water-soluble, unmodified starch; and from about 20 to 99 weight percent of a polysaccharide selected from the group consisting of cellulose, hemicellulose, cellulose derivatives, and gums, and wherein the cementitious composition and the water retention composition are substantially free of a modified starch.

27. The method of claim 26 wherein the water retention composition consists essentially of the cold-water-soluble, unmodified starch and the polysaccharide.

28. The method of claim 26 wherein the water retention composition consists of the cold-water-soluble, unmodified starch and the polysaccharide.

* * * * *